United States Patent Office 3,449,369
Patented June 10, 1969

3,449,369
OXETANE DERIVATIVES
Gilbert H. Berezin, West Chester, Pa., assignor to E. I. du Pont de Nemours and Company, Wilmington, Del., a corporation of Delaware
No Drawing. Filed Nov. 22, 1965, Ser. No. 509,186
Int. Cl. C07d 3/00; C08f 7/12
U.S. Cl. 260—333                                    6 Claims

---

ABSTRACT OF THE DISCLOSURE

Oxetane derivatives of the formula

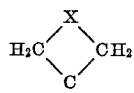

wherein X is —OH, —NH$_2$, —O—CH=CH$_2$, =NOH and

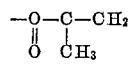

bonded to the ring carbon and provided that when X contains other than =NOH said ring carbon is also bonded to hydrogen.

---

The present invention relates to novel oxetane derivatives useful as polymer intermediates.

Synthetic polymers have attained great industrial importance in recent years. Particularly desirable polymers are those which can be crosslinked or made insoluble after forming them into fibers or films. This property allows formation of the fiber or film from the polymer solution and subsequent treatment, effecting crosslinking, makes them insoluble and thus more durable and resistant to laundering treatments. In addition, the crosslinking property can also be used to attach the polymer to a substrate, such as cellulose, to give the substrate improved properties.

It has been discovered that novel oxetane derivatives form polymers having this crosslinking property and are represented by the formula

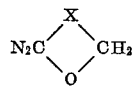

wherein X is selected from the group consisting of —OH, —NH$_2$, —O—CH=CH$_2$, =NOH, and

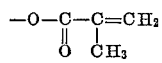

bonded to ring carbon and provided that when X contains other than =NOH said ring carbon is also bonded to hydrogen.

The process for preparing the first two compounds namely, hydroxyoxetane and aminooxetane, of the present invention is represented by the following equation:

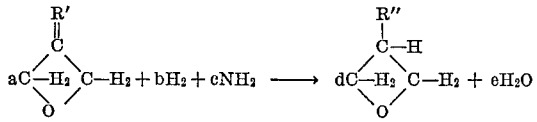

where R' is =O or =NOH and R" is —OH or —NH$_2$. When R' is =O and R" is —OH the coefficients are $a=1$, $b=1$, $c=0$, $d=1$, and $e=0$. When R' is =O and R" is —NH$_2$, $a=1$, $b=1$, $c=1$, $d=1$, and $e=1$. When R' is =NOH and R" is —NH$_2$, $a=1$, $b=1$, $c=0$, $d=1$, and $e=1$. When any coefficient is zero the term vanishes from the equation.

The reduction of the ketone to the alcohol, the ketone to the amine in the presence of ammonia, and the oxime to the amine are preferably carried out in the presence of a heterogeneous hydrogenation catalyst. These catalysts preferably are made from elements of Groups VI and VIII of the Periodic Table and most preferably from the latter. The most useful catalysts are nickel, cobalt, palladium, platinum, rhodium and ruthenium deposited on a support of such materials as carbon, alumina, silica and kieselguhr, or in active form such as the well-known Raney nickel and cobalt and Adams catalyst. When deposited on a support the metal content of the catalyst usually ranges from about 2 to 25%, and preferably from about 5–10%.

The ratio of hydrogenation catalyst to oxetane derivative should be from about 0.5 to 25% and preferably from about 3 to 20%. More catalyst can be used, but not economically.

The hydrogen pressure used can range from about 200 p.s.i.g. to about 3000 p.s.i.g. and preferably from about 500 p.s.i.g. to 1500 p.s.i.g. The upper limit of hydrogen pressure is determined only by the strength of the pressure vessel used. Below about 200 p.s.i.g. the hydrogenation is too slow to be practical.

The temperature of the reduction can range from about 15° to 125° C. and preferably from about 25° C. to 50° C. Below 15° C. the hydrogenation goes too slowly to be useful and above 125° C. there is danger of decomposition of the starting material and/or products.

The hydrogenation can be carried out in the presence or absence of a solvent but the use of a solvent is preferred. The nature of the solvent is not critical except that it must not contain catalyst poisons nor groups capable of being hydrogenated under the reaction conditions. For practical reasons it should be low in cost and easily removed from the product. Suitable solvents include water; alcohols such as methanol, ethanol, propanols, butanols; ethers such as dioxane, diisopropyl ether and tetrahydrofuran; esters such as methyl acetate and ethyl acetate; and many other liquids.

The ratio of solvent to oxetane derivative is not critical but the preferred concentration of the oxetane derivative in the solvent is about from 1 to 5 to 1.

The reductive amination of 3-oxetanone to give 3-aminooxetane is preferably carried out by treating the former with an excess of ammonia in the presence of hydrogen and a hydrogenation catalyst as described hereinbefore. Preferably a solvent is used such as water, ethanol, methane, isopropanol, n-butanol, isobutanol, tertbutanol, dioxane, and liquid ammonia.

The concentration of 3-oxetanone in the solvent is not critical because of the reaction will occur in the absence of solvent. However, amounts of oxetanone on the order of from about 20% to 80% are preferred.

The hydrogen pressure used can vary from about 150 p.s.i.g. to 3000 p.s.i.g., preferably from about 3000 to 2250 p.s.i.g.

In order to decrease the formation of secondary amines, the ammonia should be present to an extent of at least one equivalent per equivalent of ketone and preferably from about 2 to 5 equivalents.

The temperature of the reaction can be from about 40° C. to 200° C., and preferably from about 60° C. to 150° C. Below 40° C. the reduction goes too slowly to be practical and above 200° C. decomposition of the reactants and/or products occurs.

3-oximinooxetane is made by procedures given in Fuson and Shriner, "Identification of Organic Compounds," 2nd ed., p. 167, John Wiley (1940) and in Example 2 of the present application. The 3-vinyloxyoxetane is made by transfer of a vinyl group from a vinyloxy compound as exemplified hereinafter in Example 4.

3-oxetyl methacrylate is made by esterification of 3-hydroxyoxetane with methacrylic acid or by the reaction of 3-hydroxyoxetane with methacrylyl chloride as exemplified hereinafter in Example 5. The stability of the oxetane ring to acidic and basic catalysts is surprising in view of the known cleavage reactions of the 4-membered ring.

As mentioned hereinbefore, the compounds of the present invention are useful as polymer intermediates. Polymers made from them are capable of being crosslinked through opening of the oxetane ring, as illustrated in examples given below. 3-hydroxyoxetane is vinylated to give 3-vinyloxyoxetane which can be copolymerized, e.g., with tetrafluoroethylene, to give useful products such as paper coatings and textile coatings having water repellent properties. 3-oximinooxetane is hydrogenated to 3-aminooxetane which is used in making polymers having a pendant oxetane ring, as exemplified hereinafter. 3-oxetyl methacrylate is polymerized alone or copolymerized with other acrylates or methacrylates to give useful polymers for making films, as illustrated below.

EXAMPLE 1

To 30 parts of water is added 3.5 parts of 3-oxetanone and 0.5 part of 5% ruthenium on carbon catalyst. The mixture is charged to a pressure vessel and pressurized to 500 p.s.i.g. with hydrogen. Shaking is commenced and continued for 8 hours. At the end of this period the bomb is vented and the aqueous solution is decanted. The catalyst is removed by filtration and the aqueous solution continuously extracted for 2 days with methylene chloride. The methylene chloride solution is dried with magnesium sulfate. The infrared spectra of this solution gives no indication of the presence of 3-oxetanone. The methylene chloride is evaporated and the residual oil distilled. The yield of 3-hydroxyoxetane is 3 parts (85%) B.P. 80° (10 mm.).

The infrared spectrum in $CCl_4$ showed peaks at 3400, 1130, 1080, 970, and 865 cm.$^{-1}$.

The NMR spectrum gives a complex structure of 5.2–5.7 $\tau$ of 5 units magnitude and a single peak at 6.20 $\tau$ of 1 unit magnitude.

*Analysis.*—Calcd. (percent) for $C_3H_6O_2$: C, 48.64; H, 8.16. Found (percent): C, 49.18; H, 8.38.

This compound is useful as a polymer intermediate, for example, as in the preparation of 3-vinyloxyoxetane, as described in Example 4.

EXAMPLE 2

To 130 parts of hydroxylamine hydrochloride dissolved in 300 parts water cooled to 0° C., there is added 90 parts of 3-oxetanone over a 20-minute period and stirring is continued for an additional 30 minutes. At the end of this period there is added to this solution 100 parts of potassium hydroxide dissolved in 200 parts of water at such a rate that the temperature of the solution does not exceed 15° C. The solution is stirred overnight at room temperature. The solution is then saturated with sodium acetate and continuously extracted with methylene chloride for 2 days. The solvent is removed under vacuum in a rotary evaporator. The residual solid is recrystallized from a mixture of ether and petroleum ether. The yield of 3-oximinooxetane is 90 parts (82%). The infrared spectrum in methylene chloride shows the following peaks:

$$\gamma_{max.}^{CH_2Cl_2}$$

3600, 3400, 1730 (C=N), 980, 960 cm.$^{-1}$.

*Analysis.*—Calcd. (percent) for $C_3H_5O_2N$ (87): C, 41.38; H, 5.79; N, 16.09. Found (percent): C, 41.52; H, 5.67; N 15.97.

This compound is useful as a polymer intermediate, for example, as in the preparation of 3-aminooxetane, as described in Example 3.

EXAMPLE 3

To a mixture of 25 parts of 3-oximinooxetane and 5 parts of 10% rhodium on alumina catalyst in 35 parts of methanol sealed in a pressure vessel is added 30 parts of ammonia. The vessel is pressurized to 400 p.s.i.g. with hydrogen and shaking is begun. The pressure falls to 50 p.s.i.g. At this point the bomb is repressurized to 1000 p.s.i.g. with hydrogen and shaking is continued for an additional hour. At the end of this period the bomb is vented and the contents decanted. The catalyst is removed by filtration and the filtrate is distilled to yield two major fractions B.P. 50–80° C. (100 mm.) and B.P. 80–82° C. (100 mm.). The first fraction is redistilled and the liquid (B.P. 80–82° C. (100 mm.)) is combined with the second fraction, yield 14.5 parts (68%) B.P. 80–82° C. The infrared spectrum shows the following major peaks:

$$\gamma_{max.}^{CCl_4}$$

3450, 3000, 1620, 980 cm.$^{-1}$.

*Analysis.*—Calcd. (percent) for $C_3H_7NO$ (73): C, 49.30; H, 9.65; N, 19.17. Found (percent): C, 48.57; H, 10.14; N, 18.32.

The analytical information shows the product to be 3-aminooxetane.

EXAMPLE 4

To a solution of 30 parts of 3-hydroxyoxetane and 110 parts of 1,2,6-hexanetrioltrivinyl ether is added 7.5 parts of mercuric acetate which had been recrystallized from methanol. The solution is heated in a nitrogen atmosphere at 80 mm. pressure at such a temperature and rate that liquid, boiling point 65–70° C. at 80 mm., is continuously removed through a distillation column. During a 6-hour period the temperature of the heating bath surrounding the reaction flask rises from 90° C. to 140° C. and 25 parts of liquid product is obtained. This liquid is cooled to 0° C. and treated with sodium borohydride until all effervescence ceased. The liquid is then distilled, yielding 22 parts boiling at 68–70° C. at 80 mm.

The infrared spectrum in $CCl_4$ shows major peaks at 3030, 1625, 1210 and 985 cm.$^{-1}$. The NMR shows four simple bands at 3.53, 3.65, 3.77, and 3.89$\tau$ (one unit) and complex bands at 5.15–5.45$\tau$ (five units) and other complex bands at 6.0–6.4$\tau$ (two units).

*Analysis.*—Calcd. (percent) for $C_5H_8O_2$: C, 59.98; H, 8.05. Found (percent): C, 60.31; H, 8.17.

The analytical information shows the product to be 3-vinyloxyoxetane.

EXAMPLE 5

To a well-stirred solution (cooled with an ice bath) of 30 parts pyridine and 28 parts of 3-hydroxyoxetane in 120 parts methylene chloride there is added 40 parts of methacrylyl chloride dissolved in 60 parts of methylene chloride at such a rate that the temperature remains at 0° C. After the addition the solution is allowed to come to room temperature and stirred for 2 hours. To this solution is added 140 parts of ether and the combined solution is extracted with two 50-part portions of water. The organic phase is dried over $MgSO_4$ and filtered. The solvent is removed under vacuum and the residual product is treated with 140 parts ether. The resulting solution is extracted with 25 parts of water. The organic phase is again dried over $MgSO_4$, filtered and the solvent evaporated. The residual oil is distilled to give 25 parts of 3-oxetyl methacrylate boiling at 68–70° C. (10 mm.).

*Analysis.*—Calcd. (percent) for $C_7H_{10}O_3$: C, 59.14; H, 7.09. Found (percent): C, 58.73; H, 6.93.

An infrared spectrum showed peaks (in $CH_2Cl_2$) at 3030, 1725, 1640, 1200, 980, and 950 cm.$^{-1}$.

EXAMPLE 6

A pressure vessel is charged with 320 parts of tert-butyl alcohol, 0.06 part of azobisisobutyronitrile, 2.4 parts of potassium carbonate and 20 parts of 3-vinyloxyoxetane. The vessel is cooled with Dry Ice, evacuated to 1–2 min. and 21 parts of tetrafluoroethylene is added. The vessel is then closed and heated to 75° C. for eight hours. The polymer is removed from the vessel and thoroughly washed with water. It weighed 42.8 parts and contained 35.85% fluorine corresponding to a tetrafluoroethylene content of 47.2% and a vinyloxyoxetane content of 52.8%. When heated the polymer became rubbery at 48° C. and stuck to the block. The flow rate as determined by ASTM Method D–1238–57 is 0.18 (198° C.) 2160 g. The polymer is soluble in tetrahydrofuran and the inherent viscosity is 0.65 in this solvent. The infrared spectrum corresponds to that expected for a vinyloxyoxetane/tetrafluoroethylene copolymer. A film of the copolymer is prepared on aluminum by placing some of it on an aluminum sheet and pressing it at 220° C. for 2 minutes at 1500 p.s.i.g. pressure. This film has a Knoop hardness number of 11.3–13.1 under 25 g. load as measured by ASTM Method D–1474–62T (Method A). The film is tough and resilient as judged by a bump test. This test is conducted by cutting two X's in the film down to the aluminum substrate. The hemispherical end of a cylindrical indenter is held against the film over one X and a 3.2 pound weight is dropped 25 inches onto the other end of the indenter. The panel is turned over, the indenter is held against the aluminum substrate opposite the second X. The process is repeated. Delamination at each X, if any, is noted.

A 7.5% weight solution of the polymer in tetrahydrofuran is made. A piece of cotton poplin (3" x 5") is immersed in the solution, pressed in a wringer and dried. The impregnated cloth is baked for 30 minutes at 130° C. The cloth is water repellent after this treatment.

EXAMPLE 7

An ethylene-methacrylyl chloride copolymer having a weight ratio of 90–10 respectively (10 parts) is dissolved in 350 parts of dry toluene at 70° C. Triethylamine (3 parts) and 3-aminooxetane (3 parts) are added. The solution is maintained at 70° C. for 30 minutes and then poured into a large volume of acetone, filtered off and dried. A film is pressed from the dried copolymer. The infrared spectrum shows absorption at 2.95μ, 6.05μ, 6.6μ, 10.2μ, and 11.4μ.

Pieces of cotton poplin (8" x 8") are padded with a 2% solution of the copolymer in tetrachloroethylene. After padding the samples are cured for 30 minutes at 125° C. The samples are extracted twice with refluxing toluene for 4 hours. Before the toluene extraction there is about 2% pickup of resin on the cotton. After the first toluene extraction there is about 0.7% pickup which is not substantially reduced by the second extraction. The resulting fabric is water-repellent.

EXAMPLE 8

Methyl methacrylate (40 parts), 3-oxetyl methacrylate (10 parts), toluene (100 parts) and azobisisobutyronitrile (0.4 part) are mixed and heated at 85° C. for 15.5 hours. The solids content, as determined by evaporation of the volatile solvent from an aliquot of the solution, shows that 100% conversion of the two methacrylates to polymer has occurred. A clear, tough film is cast on a glass plate from another portion of the solution.

I claim:
1. A compound having the formula

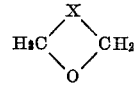

wherein X is selected from the group consisting of —OH, —NH₂, —O—CH=CH₂, =NOH and

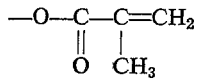

bonded to ring carbon and provided that when X contains other than said =NOH said ring carbon is also bonded to hydrogen.
2. The compound 3-hydroxyoxetane.
3. The compound 3-aminooxetane.
4. The compound 3-oximinooxetane.
5. The compound 3-vinyloxyoxetane.
6. The compound 3-oxetyl methacrylate.

References Cited

UNITED STATES PATENTS 3,209,013   9/1961   Hechenbleikner et al. ___ 260—333

OTHER REFERENCES

Chemical Abstracts, vol. 62, Subject Index J–Z, p. 1926 S, January–June 1965.

Yates et al., Tetrahedron Letters, No. 9, pp. 485–488 (1965).

Houben-Weyl, Methoden der Organischen Chemie, 4th edition, vol. X1/1 (1957).

Rylander et al., Engelhard Ind., Inc., Technical Bulletin, vol. IV, No. 1, June 1963, pp. 20–24.

NORMA S. MILESTONE, *Primary Examiner.*

U.S. Cl. X.R.

8—115.6; 117—124, 132, 135.5, 155, 161; 260—80, 86.1, 88.3, 690